March 16, 1965 P. A. MILLER 3,173,301
POWER AND FORCE TRANSMITTING DEVICES
Filed July 12, 1962

PHILLIP A. MILLER
INVENTOR.

BY Lyon & Lyon
ATTORNEYS

United States Patent Office 3,173,301
Patented Mar. 16, 1965

3,173,301
POWER AND FORCE TRANSMITTING DEVICES
Philip A. Miller, 563 Graham Road, Wapping, Conn.
Filed July 12, 1962, Ser. No. 209,441
2 Claims. (Cl. 74—243)

This invention relates and is applicable to various types of devices and apparatus for transmitting power or force. In particular, the invention is directed to a structural feature which may be employed in such devices and apparatus for improving the operation, wear and other characteristics of these conventional devices or apparatus.

There are numerous types of force and power transmitting mechanisms which employ two or more interengaging mechanical components such as a roller chain and sprocket drive, gear drives, threaded fasteners, power screws, etc. In each of these mechanisms the force or power is transmitted from one component to the other through one or more elements present on each component. For example, in a roller chain and sprocket drive, the rollers of the chain engage the teeth of the sprocket to either pull on the sprocket to rotate same or be pulled by the sprocket.

In each of these conventional mechanisms, devices or apparatus, the manner in which the interengaging elements mesh or fit is important to their operation. If a proper fit is not employed and maintained, the forces transmitted will become localized and the resultant stresses and wear to the components may become objectionable. Further, after extended periods of normal use or even short periods of use under excessive load conditions these conventional components may exhibit objectionable amounts of wear, bending, stretching, etc., which will adversely effect their operation as well as causing an increased rate of wear, bending, stretching, etc.

Accordingly, it is a principal object of this invention to provide a structural design for conventional power and force transmitting devices wherein the forces are more evenly distributed thereby reducing localized stresses and objectionable wear.

Another object of this invention is to provide a novel form of component for use in a conventional force or power transmitting device or apparatus wherein the ultimate strength of this component is substantially equal to the ultimate strength of the conventional component and yet portions of this component may flex to accommodate changes in the force transmitted and wear.

A more specific object of this invention is to provide a novel form of sprocket for use with a roller chain wherein changes in the pitch distance of the roller chain due to wear or excessive forces is compensated for by this sprocket thereby maintaining the proper force distribution and fit between the chain and sprocket.

Another more specific object of this invention is to provide a novel form of gear wherein the load and forces between the gear and a meshing gear are more evenly distributed over an increased number of teeth than is conventional.

Another more specific object of this invention is to provide a novel form of threaded fastener or power screw wherein the forces are distributed more uniformly and over a greater number of threads than is obtained with conventional threaded components.

Other and more detailed objects and advantages of this invention will appear from the following description and the accompanying drawings.

Figure 1:
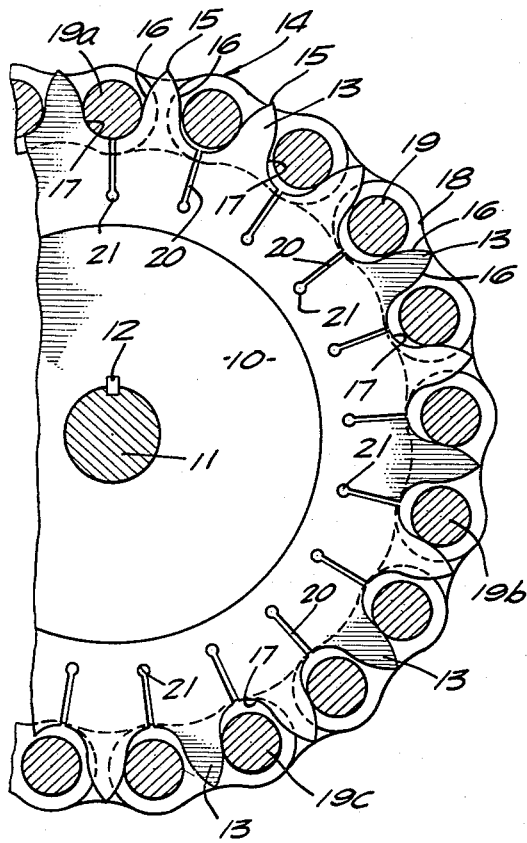
FIGURE 1 is an elevation view of a conventional roller chain with the sprocket embodying this invention and illustrates the roller chain in section as it would appear under an unloaded or nonstressed condition.
Figure 2:
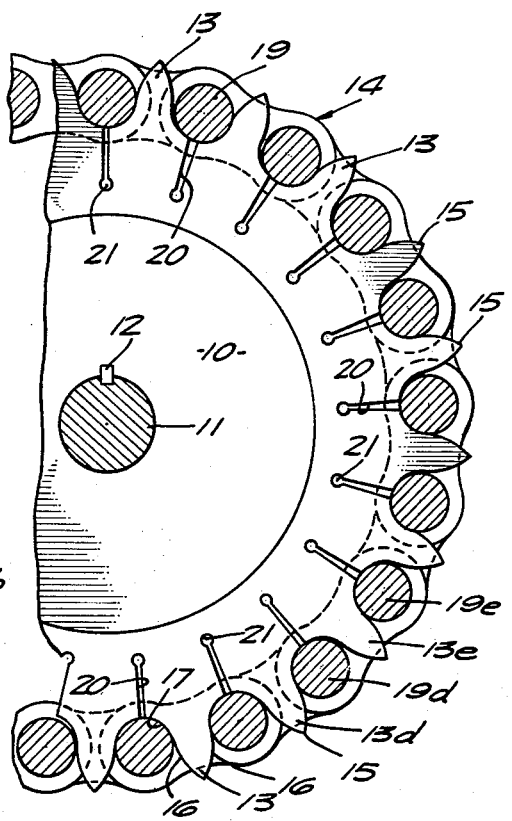
FIGURE 2 is an elevation view similar to FIGURE 1 showing the relative positions of the roller chain and sprocket under conditions where a load is being applied.

Referring now to the drawings and in particular to FIGURES 1 and 2, the sprocket 10 is adapted to be mounted on a shaft 11 by any conventional means such as key 12. The sprocket 10 may be of any width and have the appropriate number of rows of teeth 13 for receiving a single or multiple strand roller chain generally designed 14. The sprocket 10 may also be of any desired size having the appropriate pitch diameter and number of teeth 13 to accomplish the desired speed change as is conventional.

The profile of the teeth 13 is preferably conventional having a point 15, contoured sides 16, and a nearly semi-circular root portion 17. The roller chain 14 is also preferably conventional having links 18 joining rollers 19. The diameter of rollers 19 is such that each roller is adapted to fit the semicircular portion 17 of the tooth profile. The sprocket 10 is provided with a radial, inwardly extending slot 20 between each pair of teeth 13. The function and details of slot 20 is hereinafter described, but it should be noted that aside from slots 20 the sprocket 10 and roller chain 14 are completely conventional.

The center-to-center distance between rollers 19 on an unworn and unstressed chain and the center-to-center distance of teeth 13 on an unworn sprocket are such that the rollers 19 will fit each of the semicircular portions 17 for the entire portion of the circumference of the sprocket which the roller chain engages. However, FIGURE 1 illustrates a previously used chain as it would engage a conventional sprocket under no-load conditions. It is well known that after an extended period of use or after overloading of a conventional roller chain, the center distance between rollers 19 of the chain may be increased and the outer surface of the rollers 19 may become worn. Also, the contoured sides 16 of the teeth 13 of a conventional sprocket may become worn. Under such conditions the rollers 19 will imperfectly fit the semicircular portions 17 of the tooth profile for the length of roller chain which engages the sprocket. This condition is shown in FIGURE 1 where it may be seen that roller 19a fits portion 17 but, for example, rollers 19b and 19c engage the contoured side 16 of the tooth profile rather than engaging the semicircular portions 17. Under such conditions it has been found that the rate of wear of the chain and sprocket greatly increases and the operation becomes noisy.

Referring now particularly to FIGURE 2, the sprocket 10 of this invention and roller chain 14 are shown under a loaded or operating condition. To illustrate the effect of this invention, the roller chain 14 of FIGURE 2 is also the same as the roller chain 14 of FIGURE 1 in that the chain is worn and the center distance between rollers 19 has been increased over the desired distance due to use of the chain. It is to be understood, however, that the sprocket 10 of this invention may be used with equal effectiveness with an unworn and unstretched chain 14 and in fact will minimize such wear and stretching as will become apparent from the following description.

As shown in FIGURE 2, sprocket 10 is either the driver sprocket rotating in a counterclockwise direction or the driven sprocket being rotated in a clockwise direction. That is to say, the portion of the roller chain 14 extending to the left from the lower portion of FIGURE 2 is subjected to the tension required for transmitting the force between sprocket 10 and another sprocket, not shown. Thus, the torque forces are, respectively, counterclockwise by the sprocket 10 and clockwise by the chain 14. The slots 20 between each of the teeth 13 in effect increase the beam length of the teeth 13 so that under force conditions each tooth 13 may be flexed toward or away from the next adjacent tooth 13.

Thus it may be seen in FIGURE 2, that each roller 19 engages one contoured side 16 of one tooth 13 and actually engages one half of the semicircular portions 17. For example, roller 19d engages tooth 13d slightly bending that tooth in a clockwise direction. Roller 19e engages tooth 13e to slightly bend that tooth in a clockwise direction. Likewise the remaining rollers will engage one of the teeth to slightly bend that tooth and thereby absorb a portion of the total tension in the chain 14. Thus it may be seen that the entire tension force of roller chain 14 is not carried by one or two teeth 13, but rather is distributed over most of the teeth engaged by the chain. The amount of load carried by each tooth and the amount of bending of each tooth at any particular instant of time will depend on numerous factors such as, but not limited to, the amount of wear to that particular roller, the center distance between that roller and each adjacent roller, the position of the tooth relative to the location where the tension is being applied, etc. It is to be noted that the slots 20 in sprocket 10 may be slightly spread open or closed, as shown in FIGURE 2, depending on the force being applied to the two adjacent teeth on either side of that slot.

Thus, it may be seen by reference to FIGURE 2 that each of the rollers 19 engages a tooth 13 to distribute the load between the roller chain 14 and the sprocket 10 over the maximum number of teeth and rollers, thereby minimizing the force between each individual roller and the tooth it engages. This minimizing of the force between individual rollers and teeth serves to minimize the wear on the rollers and teeth and also minimizes the stresses developed in each link 18 thereby reducing the possibility of stretching the links 18 by continued use or overloading. The overall strength of the sprocket 10 is not appreciably affected since the slot 20 are relatively narrow and the resultant distance between slots 20 is much greater than the width of each tooth 13 between the sides 16. Thus, it may be seen that the weakest point on the tooth profile of the sprocket is still the tooth itself which generally has been found to be highly adequate. The inner limit of the slots 20 are preferably provided with a rounded portion 21 to minimize localized stresses which would be developed if slot 20 merely had a square end. The rounded portion 21 may be a circular hole as is conventional machine practice in such applications for minimizing localized stresses. Although the slots 20 have been illustrated and described as being radial, it is to be understood and will be apparent to those skilled in the art that the slots 20 may extend at an angle to the radius of the sprocket.

Figure 3:
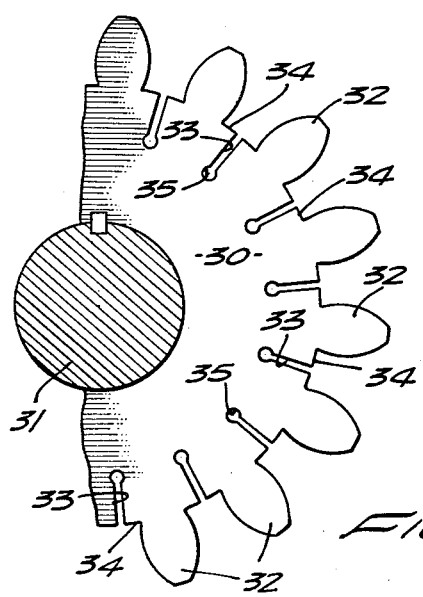
FIGURE 3 is a fragmentary view of a spur gear embodying this invention.

Referring now to FIGURE 3, a spur gear 30 employing the principles of this invention is shown. As is conventional, the spur gear 30 is adapted to be mounted on a shaft 31 and is provided with gear teeth 32 appropriately spaced around the periphery of the gear. The gear 30 is adapted to mesh with another spur gear (not shown) which may be of conventional configuration or similar to spur gear 30. The spur gear 30 is provided with a slot 33 extending radially inwardly from the root portion 34 between each of the teeth 32. Slot 33 terminates at its inward extent at a rounded portion 35 for minimizing localized stresses identical to the rounded portion 21 previously described. The slots 33 effectively increase the beam length of the gear teeth 32 without adversely affecting the ultimate strength of the gear as has been described relative to providing the slots 20 in the sprocket 10. As is well known in the art, the number of teeth of a conventional spur gear that will engage the teeth of a meshing conventional spur gear will depend on a number of factors such as the diameters of the gears relative to the number of teeth, the exact configuration of the teeth, etc. For example, with conventional spur gears having a relatively few number of teeth on each gear, there will probably only be one or two teeth on each gear which engage the teeth of the other gear whereas a spur gear meshing with a ring gear having internal teeth may have a number of inter engaging teeth. With the spur gear 30 of this invention, the forces transmitted by the gear will be more evenly distributed over all of the inter-engaging teeth due to the ability of the teeth 32 to flex or bend as the load is applied. Thus, it may be seen that the advantages and effects of using the spur gear 30 of this invention are similar to those set forth above relative to sprocket 10 of this invention. Further, it may be seen that the principles employed in this invention as described relative to a spur gear 30 are equally applicable to use with other types of gears.

Figure 4:
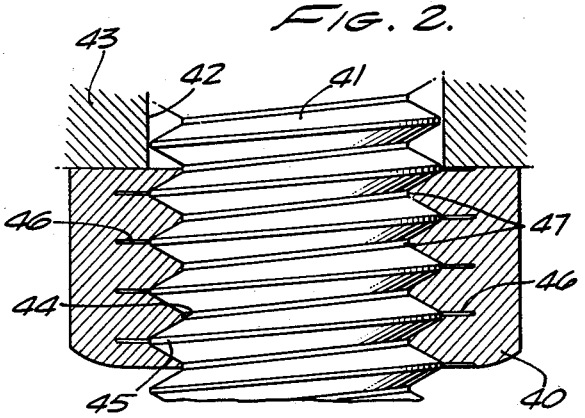
FIGURE 4 is a sectional elevation of a threaded fastener embodying this invention.

Referring now to FIGURE 4, a threaded fastener employing the principles of this invention is illustrated. An internally threaded collar or nut 40 is adapted to be threadedly received on an externally threaded shaft, rod or bolt 41. The nut 40 and bolt 41 may be used in any conventional manner such as the bolt 41 passing through a bore 42 in a workpiece 43 to secure another workpiece (not shown) to workpiece 43. The nut 40 and bolt 41 are illustrated as having conventional V threads 44 and 45 respectively, but it is to be understood and will be apparent to those skilled in the art that the invention is equally applicable to other styles of threads. A helical slot 46 extends radially and outwardly from the root portion between each thread 44 and coincides with such root portion for substantially the length of the threads in the nut 40. It is also to be understood that a slot similar to slot 46 may be provided in the root portion 47 of the bolt 41 although this may adversely weaken the bolt and therefore it is preferred that the slot be provided in the nut 40. As is well known in the art, when a conventional nut is tightened onto a conventional bolt as a fastener for any convenient purpose, the stresses and strains developed in the threads and bodies of the nut and bolt vary according to the style and size of threads. It is also well known that the greatest portion of the tension force between a nut and bolt fastener is resisted by the last convolution of thread on the nut which is adjacent the workpiece, i.e., in the direction of the tension; a smaller proportion of the force is resisted by the next convolution of thread; a still smaller proportion of force is resisted by the next convolution of thread and so on. The tension force in the fastener tends to shear the threads at their root portion and the ultimate strength of a threaded fastener is conventionally determined by calculating the shear force which the threads can resist or the tension strength of the bolt. Assuming that the bolt is of a proper size and will not fail in tension, the ultimate strength of the fastener must be determined by the shear strength of the threads. In performing such a calculation, it is generally considered conventional not to calculate the cross-sectional area of the root diameter of the nut for the entire length of the threads on the nut, but rather to assume that some smaller number of threads less than the entire length will fail before the remainder of the threads. The number of threads which is assumed will depend on the style of thread, such as, for example, it is generally assumed that with a V-shaped coarse thread only three threads are effective to support the entire shear load.

With a nut 40 of the type shown in FIGURE 4, having a slot 46, the beam length (radially) of the internal threads is increased thereby permitting the threads to bend or deflect further without shearing. As the load on the nut and bolt fastener is increased, through the tightening of the nut and bolt or otherwise, the bolt 41 will tend to elongate as is well known and this elongation can be accommodated by the bending of the threads 44. Thus, the load on threads 44 is distributed more equally throughout the length of the nut 40 thereby resulting in a higher ultimate strength of the nut and bolt assembly than is possible with conventional threaded fasteners. The reduction in shear area caused by providing slot 45 is more than compensated for by the distribution of the forces over additional threads 44. It is to be understood that the heretofore described structure and principles as to the threaded fasteners shown in FIGURE 4 is equally applicable to power screws and the like.

Thus it may be seen that I have provided a structure for force or power transmission devices, mechanisms and apparatus which serves to distribute the conventional forces developed in such devices, mechanisms or apparatus over a larger number of the force transmitting elements thereof, thereby improving the effectiveness, operation and wear characteristics of the particular device, mechanism or apparatus. The principles employed and described in the three particular embodiments illustrated of a chain and sprocket, a spur gear, and a threaded fastener are equally applicable to other mechanical devices as will appear to those skilled in the art. Moreover, it is to be noted that it is not essential that the slots provided in any style of component be perfectly radial although the slots are so illustrated in the drawings. Having fully described my invention it is to be understood that I do not wish to be limited to the details herein set forth or to the details illustrated in the drawings, but my invention is of the full scope of the appended claims.

I claim:

1. A power and force transmitting device for use with a rotatable shaft, comprising, a sprocket for fixedly mounting on such shaft, a roller chain having spaced rollers, a plurality of circumferentially spaced teeth on the sprocket for engaging the rollers on the chain, an inwardly extending slot between each of the teeth for permitting independent relative movement between each of the teeth in either circumferential direction during force transmission, and a portion of said roller chain engaging a plurality of said teeth around a substantially circumferential portion of the sprocket, the said teeth engaging the rollers of the chain flexing in a circumferential direction for each such tooth to transmit force between the chain and the sprocket and to flex to a position for accommodating the spacing between rollers of the chain, the said flexing of each tooth solely in response to the said force transmitted by such tooth.

2. The combination of claim 1 wherein the inner extremity of each said slot is rounded and larger than the width of the slot.

References Cited by the Examiner

UNITED STATES PATENTS

| 1,501,123 | 7/24 | Ljungsfrom | 74—461 |
| 1,772,986 | 8/30 | Dunham | 74—461 |
| 2,259,937 | 10/41 | Klaucke | 74—243 |
| 2,349,651 | 5/44 | Davis | 85—32 |
| 2,487,870 | 11/49 | Harrison | 74—243 |

FOREIGN PATENTS

| 982,622 | 1/51 | France. |
| 270,023 | 2/14 | Germany. |

DON A. WAITE, *Primary Examiner.*

BROUGHTON G. DURHAM, *Examiner.*